June 10, 1941.  J. D. NIXON  2,245,002
MEANS FOR CONTROLLING THE FLOW OF FLUIDS
Filed Nov. 16, 1939  6 Sheets-Sheet 1

Fig.1   Fig.2   Fig.3

Inventor
Jeddy D. Nixon
By Jack Ashley Jr.
Attorney

Inventor
Jeddy D. Nixon
Jack Atchley Jr.
Attorney

Patented June 10, 1941

2,245,002

UNITED STATES PATENT OFFICE 2,245,002

MEANS FOR CONTROLLING THE FLOW OF FLUIDS

Jeddy D. Nixon, Houston, Tex., assignor of one-half to Wilson Supply Company, Houston, Tex., a corporation of Texas Application November 16, 1939, Serial No. 304,684

28 Claims. (Cl. 103—231)

This invention relates to new and useful improvements in means for controlling the flow of fluids.

This invention is an improvement on my Patents No. 2,132,081, No. 2,164,469, No. 2,171,478, No. 2,171,479, No. 2,171,480, No. 2,171,812, Reissue No. 21,199; No. 2,202,462, and No. 2,204,817.

One object of the invention is to provide certain improvements in my above patents.

Another object of the invention is to provide improved means for controlling the admission of pressure fluid into a flow line to control the flow of the fluid therein, whether the pressure fluid is supplied from the source of the fluid or from an outside source.

Still another object of the invention is to provide improved means for introducing fluid under pressure into a well tubing at a single point below the standing fluid level therein, and so arranged that a simple and very efficient installation is had, whereby the flexibility of the device readily permits the invention to be installed at various locations to meet the different requirements presented.

Still another object of the invention is to provide an improved device that may be used with any suitable fluid lift and so arranged that the flowing or producing of the well fluid is positively controlled from the surface of the well.

A further object of the invention is to provide a control device so constructed that it may be readily operated to handle the well fluid regardless of the producing conditions encountered.

In the majority of oil wells the well bore provides a column of liquid which consists of a body of oil floating on a strata of water and it is an important object of the invention to provide improved means for controlling the supply of lifting fluid, whereby said lifting fluid is employed to displace the well liquid and lift the same by applying the lifting fluid onto the upper surface of the body of oil for forcing the strata of water up the discharge pipe ahead of said body of oil; thus the lifting fluid exerts its lifting force against said body of oil which prevents said lifting fluid from channelling through the accumulated well liquids and making for increased and economical lifting efficiency.

An important object of the invention is to provide a well flowing device having a lifting fluid inlet and closure means therefor, together with means for normally holding the closure means open and operable from the surface of the well to release said closure means, whereby the lifting fluid will actuate said closure means and shut off the admission of lifting fluid.

A particular object of the invention is to provide improved fluid flow control means so arranged that the well fluid may be produced or lifted from below, and relatively through a packer or seal-off device, without injecting the lifting fluid into the lower portion of the column of well liquid in order to elevate the same.

As the column of well liquid builds up in a well, the back pressure exerted on the producing formation by such column increases proportionally and this increasingly retards the flow of well liquids into the well bore or opening, thus it becomes desirable to hold the column to a minimum height by lifting the well liquids at such frequencies as to maintain relatively short columns of well liquids which reduces the back pressure and permits the well liquids to flow into the well bore or opening without undue retardation. Therefore, by disposing the flow device at the lower end portion of the well, only a short column of well liquids need be built up and this column may be rapidly displaced without accumulating high pressures at the bottom of the well and thus increasing the rate of recovery of well liquids as well as reducing the production costs.

Another particular object of the invention is to provide a device so constructed that in producing the well, the pressure fluid is delivered upon the upper surface of the column of well liquids to displace said liquids and begin the movement thereof before said pressure fluid gets beneath said well liquids and exerts its full lifting force upon said column of liquids. With this arrangement, a greater volume of well liquids may be handled and produced more readily with approximately the same or less pressure and with much less volume of pressure fluid than is ordinarily required.

A number of wells are called low fluid wells because the bottom hole pressure is low and the well liquids will not rise very high in said well; or due to the tightness of the producing sand, the well liquids are produced very slowly; or due to the small amount of liquids in the producing sands, said well liquids do not accumulate rapidly and a great amount of time would be reqiured to build up a relatively high column of well liquid When one of these conditions occur, the usual type of gas lift is not very successful due to the greater quantity of pressure fluid required and the small amount of well liquid lifted, which makes gas lifting expensive and impractical.

Also, many of these wells and other types of wells have a number of feet of uncased hole at the bottom of the well and it is very desirable in a number of instances, to use a closed system to lift or produce said well fluid from this uncased portion of the well. When a pressure fluid such as gas is introduced beneath a column of standing well fluid, there is a tendency for the pressure fluid to channel through the well fluid and break up said well fluid; unless the pressure fluid is introduced in a sufficient volume to lift the well fluid as a unit, or unless the pressure fluid is introduced to a moving column of well fluid. It is desirable to have the pressure of the well liquid, which is exerted on the producing formation, as low as possible at all times, so as to get the maximum recovery therefrom.

An important object of the invention is to provide fluid flow control means suitable for low fluid type of wells which is operated from the well surface and so constructed that the well fluid may be produced from any point at the bottom of the well which is necessary to lift said well fluid in accordance with its flow into said well, whereby a low fluid type of well may be readily and economically produced.

Still another important object of the invention is to provide fluid flow control means so arranged that the well fluid may be produced in a closed system from the uncased portion of a well, whereby said well fluid may readily flow from the producing sands into said uncased portion, as well as into said lifting or control means and said pressure fluid is prevented from exerting a back pressure on said uncased portion and said producing sand, or in said lifting means to restrict the inflow of said well fluid.

A further object of the invention is to provide a flow device which delivers the full lifting force of the pressure fluid to a moving column or body of well liquids, whereby said well liquids are produced in a body or "slug" and not in a spray or small heads. Also, whereby the cutting, emulsifying or other damage to the well liquids caused by other types of pressure fluid lifting devices is substantially eliminated and the necessity of troublesome and expensive treatments of said well liquids is reduced to a minimum.

A particular object of the invention is to provide a device so arranged that in producing the well the pressure fluid is delivered onto the upper surface of the well fluid to displace said well fluid and begin the movement thereof up the flow pipe of the well before said pressure fluid is introduced under said well fluid to exert a lifting action thereon, whereby a great volume of well fluid may be handled more readily.

Another object of the invention is to provide a flow device that introduces the full lifting action of the pressure fluid to a moving column or body of well fluid, whereby said well fluid is produced in a body or "slug" and not in a spray. Also, the well fluid is not cut, channeled, or damaged by the action of the pressure fluid.

Still another object of the invention is to provide an improved valve structure for controlling the admission of the pressure fluid into the well tubing, whereby sanding, clogging, or faulty actuation of the valve is eliminated and an efficient operation thereof is obtained.

It is pointed out that a number of wells will not produce a sufficient quantity of fluid to maintain a producing level above the lower end of the well casing or above the upper end of a "liner" (a reduced section of pipe in the bottom of a well on the lower end of the casing and usually perforated), so that the well fluid can not be lifted at regular intervals. In these low fluid type of wells, a packer or other type of seal-off device is used to force the well fluid to rise in the well tubing, and to prevent the pressure fluid from exerting a back pressure on the well formation as well as to permit the pressure fluid to be introduced into the well tubing adjacent the lower end of the well casing.

A particular object of the invention is to provide fluid flow control means so constructed that the well fluid will be produced or lifted from below and through a packer or seal-off device.

An important object of the invention is to provide fluid flow control means so arranged that the producing or lifting of the well fluid may be controlled from any distance below the packer or seal-off to the bottom of the well, as desired.

Another object of the invention is to provide an improved system of controlling the flow of fluids which consists in, a supply of pressure fluid, conducting a portion of the pressure fluid to the fluid being controlled to flow the same, regulating the introduction of the conducted portion of pressure fluid to said controlled fluid, and controlling the point of introduction of said conducted portion of pressure fluid.

Still another object of the invention is to provide an improved device which does not obstruct the flow of fluid therethrough and which is so constructed as not to catch or hang in the casing when the tubing is being run in or out of the well.

A further object of the invention is to provide an improved valve in which the closure member is a ball, so that no undue amount of friction will be had between said member and the actuating element.

Still another object of the invention is to provide flow control means so arranged that the actuating member upon entering said means will ride on the balls, so that the pressure fluid flowing through the opened ports will continue to center said actuating member in said flow means and prevent contact of said actuating member with said means, whereby a cushioning or floating action of said actuating member is had in said means.

A construction designed to carry out the invention will be hereinafter described, together with other features of the invention.

The invention will be more readily understood from a reading of the following specification and by reference to the accompanying drawings, in which an example of the invention is shown, and wherein.

In the drawings the numeral 30 designates the usual well casing (Figure 1) which has a well tubing string 31 depending axially therethrough. The upper end of the casing is screwed into the usual casing head 32, mounted above the ground level, and the upper end of the tubing is supported within the casing head in the regular manner. All of the above ground structure may be substantially the same, as that set forth in my above-mentioned patents, although such structure has not been shown and is subject to variation, as it forms no part of the present invention.

The tubing string may extend substantially the full length of the casing, or it may depend from the lower end thereof and ordinarily extends to within a short distance of the bottom of the well. The lower end of said tubing is preferably provided with a suitable perforated nipple or bull plug 33. Any desired type of packer 34 is mounted in said tubing string near the lower end of said casing, or if the casing has been perforated, then the packer is set a short distance above the perforations. However, if a liner (not shown) is used on the lower end of said casing, a lead seal (not shown), a set-down packer (not shown), or other type of seal-off device (not shown) may be used, as desired.

One of the main features of this invention lies in the fact that the flow control means may extend through the packer or seal-off device and the well fluid produced from below said packer and therethrough. While any packer suitable for the purpose may be used with the invention, applicant prefers to use the packer shown, which is his own design and will be described in detail later in the specification. Also a packer such as shown in my Patent No. 2,171,479, may be used. However, the invention is not to be limited to any particular type of packer or seal-off device.

The middle and upper portion of said tubing string preferably has a series of elongate flow valves 35 mounted therein and constructed as set forth in my above-mentioned patents and particularly my Patent No. 2,171,480. The number and spacing of the valves used depends on the conditions and circumstances surrounding each individual well, as well as the use or requirements of any other flow or well equipment. These valves are usually operated by any elongated weight bar (not shown) suspended on the lower end of a wire line 36, that extends up through said tubing and out the upper end thereof, through a stuffing box (not shown) to a suitable controlling mechanism (not shown).

In explaining the invention, it will be described and illustrated as a fluid control for fluid lifts, such as are used to elevate well fluids in a well. This fluid lift may be similar to that taught by my patents, or to that purchased on the open market, although it is preferred to use my own lift.

Fluid lifts of this type use a pressure or lifting fluid to raise the well fluid by both displacement and by lifting. This pressure lifting fluid is usually under a pressure of from 250 pounds to 1,000 pounds per square inch and is supplied from a suitable source (not shown), such as a compressor, casing head gasoline station, or a gas well.

The pressure fluid is delivered to the well through a pipe 37 into the casing head 32. Thus, it will be seen that the well casing 30 will contain pressure fluid at substantially the same pressure as the pipe 37. The admittance of this pressure fluid from the casing 30 into the tubing 31 at pre-determined points is preferably controlled from the surface of the well, which points are the location of the flow valves 35 mounted in said tubing string.

The well fluid flow control means or device is mounted approximately on or near the lower end of said tubing string intermediate the lowermost flow valve and the packer, preferably nearer the latter. The upper and lower ends of the device are constructed of two cylindrical, flow valve bodies 38 and 39 spaced apart and so connected together that all of said device may be connected into said tubing string by a pair of cylindrical collars 40 and 41. The collar 40 is mounted on the upper end of said device for connecting onto the lower end of said tubing above said device and the other collar 41 is mounted on the lower end of said device for connecting onto the upper end of said tubing below said device.

The upper end of the upper flow valve body 38 is provided with a co-axial, upstanding, externally screw-threaded pin 42 for engaging the internally threaded box 43 on the lower end of the collar 40 for mounting said collar on said valve body and said device. A suitable packing or sealing ring 44, preferably a soft metal such as brass, is interposed between said collar and said valve body to prevent leakage therebetween. A similar threaded pin 45 depends from the lower end of said valve body 38 for engaging in an internally screw-threaded box 46 on the upper end of an elongated, cylindrical collar or nipple 47. The lower end of the nipple is formed with an internally screw-threaded box 48 for receiving an upstanding, threaded pin 49 on the upper end of an elongated, co-axial, tubular sub or mandrel 50.

The lower end of the mandrel has an internally screw-threaded box 51 for engaging with an upright, externally screw-threaded pin 52 on the upper end of the valve body 39, similar to the pin 42 on the upper end of the valve body 38. The lower end of said body 39 is provided with a depending, externally screw-threaded box 140 on the upper end of the collar 41.

The valve bodies 38 and 39 are similar in construction and substantially the same as set forth in my patents and particularly my Patent No. 2,171,480. Due to their similarity the following description refers equally well to said valve body 38 and/or 39.

Said valve body is provided with an internal, cylindrical chamber 231 with a number of inwardly directed, guide ribs 232 extending thereinto and having their upper and lower ends beveled. A plurality of radial, internally screw-threaded ports 233 extend outwardly through the walls of said valve body and provide communication between the annular space within said casing 30 and said tubing when said ports 233 are open, whereby pressure fluid may enter said tubing from said annular space of said casing and any well fluid that has been produced from the formation and trapped in said tubing above said ports, will be lifted and carried out of said tubing to the surface. It is preferred to locate one of the ports in each rib and all in the same horizontal plane. Each port is provided with a valve cage or insert unit 234 which is threaded thereinto and has a coaxial, longitudinal passageway 235 extending through each valve cage. A ground, tapered seat is formed at the inner end of each passageway. A ball valve 237 is mounted in the passageway of each valve cage 234 for engaging the seat thereof and closing said passageway, whereby each of said ports is closed. The outer end of each passageway is internally screw-threaded, so as to receive a perforated cap or button 238 to close said outer end and retain said ball valve therein.

Whenever pressure fluid is introduced into the annular space of said casing and encounters or exerts sufficient pressure to cause a flow of fluid around said balls 237 through said ports 235, the passage of said fluid through said open ports will carry said balls onto their respective seats in said passageways, and thereby close said open ports as well as shut off said tubing from said annular space. It will be noticed in Figures 4, 7 and 8, that when said balls are in their closed or seated position, a portion thereof protrudes into said chamber 231 from said seats and the guide faces of said ribs 232, whereby a suitable actuating member may engage and unseat said balls.

It will be seen in the drawings that the outer ends of said ports are countersunk to form a circular, shallow recess or sump for the valve cages 234 to seat or fit into. These recesses are preferably of a sufficient depth to accommodate said valve cages, so that said cages, including the buttons 238, will not protrude from the annular surface of said valve bodies; whereby, when said tubing is being run into or out of a well with the valve bodies mounted therein, said buttons 238 will not contact the wall of said casing and wear their outer ends nor fill and become clogged with foreign matter.

It is particularly pointed out that with the three valved ports spaced as shown in the drawings, the pressure of said fluid entering the opened ports will be balanced or equalized on said actuating member, so that said member substantially floats in the valve body being held open. Therefore, there will be no excessive nor unbalanced pressure against said actuating member to interfere with its operation nor to cause undue wear on said ribs or said actuating member. It is to be understood that while said valve bodies have been shown and described with three ports and three valve cages, it is made and used with one, two, four, and six ports and cages. It is not intended to limit the invention to any number of ports and cages nor to any particular arrangement of said ports as to position. Although, it is preferred to use valve bodies with one or more series of three ports in a horizontal plane, as such spacing and use tends to give a balancing and floating action to the actuating member for said valves in said ports.

The bore 53 of the nipple 47 is provided intermediate its ends with a reduced portion 54, forming a restricted passageway 55 at this point. The upper face 54' is tapered, so that an actuating member will be guided into the restricted passageway 55. The underside or lower face of the reduced portion is also tapered, similar to the upper face 54', but at a different angle so as to form a guide and seat 56 for a plurality of resilient fingers or dog members 57 (Figures 2, 4, 7, 12, 15, and 16). These dogs serve a dual purpose of gripping and sealing around the actuating member, as will be brought out later.

Figures 1, 2, 3:
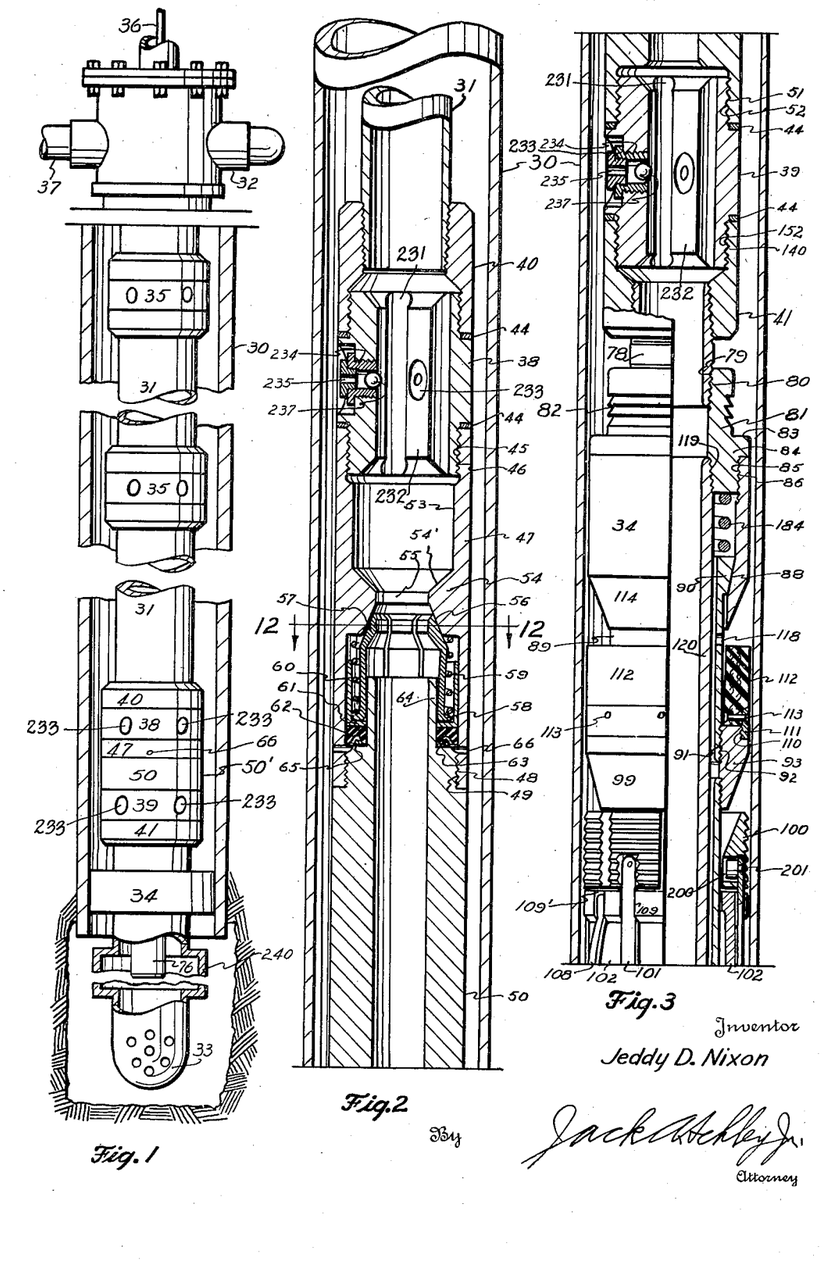
Figure 1 is a diagrammatic view showing the fluid flow control means and constructed in accordance with the invention, and mounted in a well.
Figure 2 is a view, partly in section and partly in elevation, of the upper portion of said means and showing the position of the parts before pressure fluid is admitted into the well.
Figure 3 is a continuation of Figure 2 and showing the middle portion of said means.
Figures 4, 5:
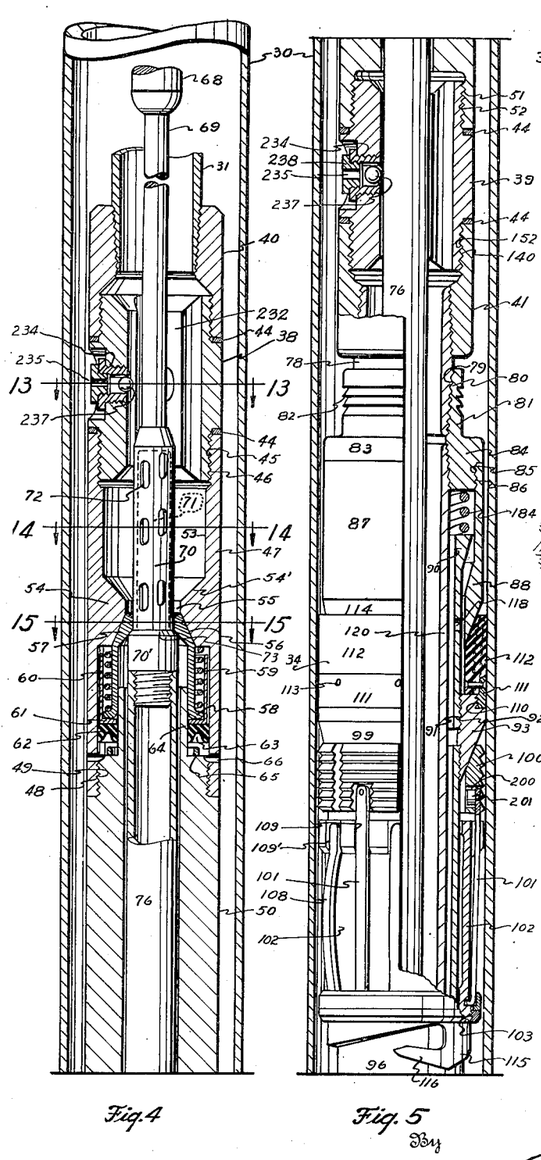
Figure 4 is a view, similar to Figure 2, after pressure fluid has been admitted and the well fluid produced or lowered down to said means, the actuating element being shown in an operating position.
Figure 5 is a continuation of Figure 4 showing the middle portion of said means.
Figure 7:
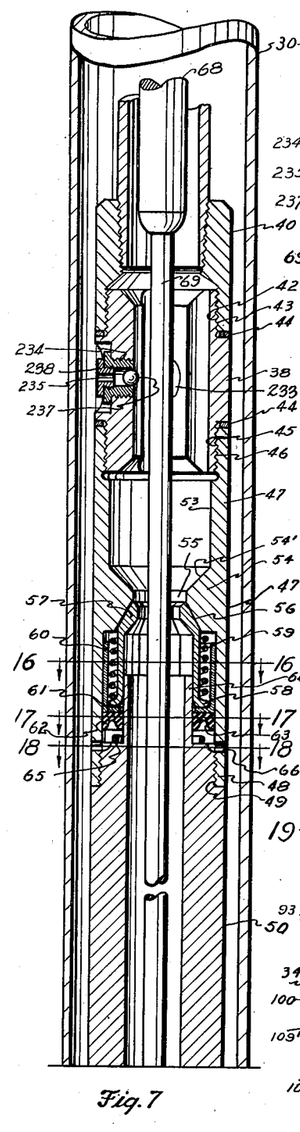
Figure 7 is a view, similar to Figure 4, showing the actuating element in an inoperative position.

The lower ends of said dogs (Figures 2, 4 and 7) are formed with an outwardly directed flange 58, so that a suitable coiled spring 59 may rest thereon and exert a downward pressure or tension on said dogs. The lower portion of said dogs 57 and the spring 59 are encased within a cylindrical piston or housing 60 having a sliding fit within the bore 53 below the reduced portion 54 and above the threaded box 48. It will be noticed that the lower end of the piston 60 has an inturned lip or flange 61 for supporting the lower end of said dogs and extending across the upper face of a sealing or packing ring 62, which preferably has an annular groove or channel 63 cut in its lower face, as shown in Figures 2, 4 and 7, whereby a pair of depending, annular sealing lips are formed on the lower edge of said ring 62.

The pin 49 is provided with an upstanding, concentric collar or sleeve 64, which serves as an inner guide surface for the dogs 57, the piston 60 and the packing ring 62. Thus, it will be seen that these parts slide between the wall of the bore 53 of the nipple 47 and the outer surface of the sleeve 64. A stop ring 65, preferably made integral and concentric with said pin 49 and sleeve 64, but may be separate therefrom, is provided to limit the downward movement of said packing ring 62 and to keep the channel 63 of said packing in an open position. The lower end of said nipple 47 adjacent the upper end of said box 48 is formed with a plurality of radial ports 66, so that pressure fluid from the well casing may enter through the ports 66 into the bore 53 of said nipple beneath said packing ring 62 and into said channel 63 of said packing ring. The pressure of said fluid will be exerted against the sealing lips, forcing them into sealing engagement with the sleeve 64 and the wall of the bore 53, as well as lifting said packing ring 62, piston 60, dogs 57 and compressing the spring 59.

When there is no pressure fluid in said casing 30, the dogs 57, spring 59, piston 60 and packing ring 62 are in their lowermost position (Figure 2), due to the tension of said spring 59. When the pressure fluid is admitted into said well casing, these parts are lifted to their uppermost position (Figures 4 and 7) and the upper end of the dogs 57 riding on the guide surface 56 meet and form a seal, whenever the actuating member is in between said dogs.

The lower end of the wire line 36 is provided with an elongate, cylindrical, weight bar 68 having a reduced portion 69 formed on its lower end. This reduced portion has its lower end threadably connected to the upper end of a slightly enlarged, tubular sleeve or coupling member 70 having an axial bore or passageway 71 extending from its lower end to within a short distance of its upper end. The sleeve is formed with a plurality of elongated perforations 72 for providing communication between the bore 71 and the outside of said sleeve; so that fluid may enter the lower end of said bore, readily flow up therethrough, out of said perforations 72 and up around said sleeve. The lower portion of said sleeve is externally upset at 70', so as to form an annular, external, tapered seat 73 for engaging the underside of the dogs 57 and forming a seal therewith (Figure 4).

A tubular, externally screw-threaded pin 74 depends from the lower end of the upset portion of said sleeve for engaging in an internally screw-threaded box 75 on the upper end of an elongate, tubular actuating member or rod 76. This actuating rod extends down through the packer or seal-off device 34, and the tubing connected to the lower end of said packer, to within a relatively short distance of a regular standing valve 77 mounted on the upper end of the bull plug 33. It is preferred to use a standing valve with this invention and to mount the same on top of the usual bull plug 33 in the lower end of the tubing. Attention is called to the fact that the lower edge of said actuating bar 76 is beveled, so that said bar may readily enter said valve bodies and the restricted passageway 55 of said reduced portion 54 of the bore 53 of said collar 47.

While any suitable packer or seal-off device may be used with satisfactory results, it is preferred to use the packer disclosed and as set out in my Patent No. 2,171,479, wherever possible; although, in some instances other types of sealing devices will be required. The collar 41 on the lower end of the valve body 39 is threadably connected to a short nipple 78 having a suitable externally screw-threaded pin 79 on its lower end for engaging in an internally screw-threaded box 80 of an annular, upright cap or head 81 of the packer, whereby said packer may be attached in said string of tubing 31 and to said fluid flow control means. The cap is formed with the usual fishing neck 82 on its upper portion and is provided at its lower end with a radially extending flange 83. A tubular pin 84 depends from said flange and has external screw-threads 85 formed thereon for engaging in an internally screw-threaded socket 86 on the upper end of a cylindrical sleeve 87. When the sleeve 87 is threaded onto the screw-threads 85, the upper end thereof abuts the underside of the flange 83 and forms a fluid-tight joint.

The lower end of the sleeve is thickened or upset and an internally tapered or inclined socket 88 is formed therein. A tubular mandrel 89 or a section of tubing which forms the axial support or body of said packer, as well as the usual bypass or drain for the well fluid, extends upwardly through the upset portion on the lower end of the sleeve 87 and the socket 88. The upper end of the mandrel is also upset or thickened and provided with an internal, inclined supporting surface or head 90. This inclined head matches the inclined socket 88, so that said mandrel 89 and sleeve 87 are slidably connected together. The purpose, function and reasons of this connection will be described more in detail later.

The lower end of said mandrel terminates in an externally screw-threaded pin 91 for connecting in an externally screw-threaded box 92 on the upper end of an upstanding collar 93. The lower end of the collar 93 is provided with an internally screw-threaded box 94 for receiving an externally screw-threaded pin 95 on the upper end of a section of tubing 96 forming a continuation of the mandrel 89. The lower end of the mandrel 96 is screwed into a suitable stop or supporting collar 97 having a co-axial opening 98 therein for the flow of well fluid therethrough, said collar may be finished as desired.

The lower portion of the outer surface of said collar 93 is tapered, so that a frusto-conical guide surface 99 is presented for a plurality of suitable gripping slips 100 to coact therewith. The slips are arcuate in cross-section, so as to conform to the guide surface and when said slips ride upon said surface, they will be wedged between said collar 93 and said casing 30, gripping said casing and preventing further downward movement of said packer. The slips 100 are mounted on the upper end of flat spring arms 101 by a large cylindrical stud pin 201 on each spring arm engaging in a socket or recess 200 in the lower portion of said slips.

A cylindrical, supporting body or cage 102 has a sliding fit on the mandrel 96 intermediate its ends and adjacent the lower ends of said slips. The lower end of the cage 102 is externally screw-threaded at 103 to receive a retaining ring 104 thereon. The lower end of each of the spring arms 101 is bent inwardly to form a short finger 105 for engaging in an annular groove 106 just above and contiguous to the screw-threaded portion 103. It will be seen that the lower portion of the spring arms above said fingers fit in longitudinal slots 107, extending upwardly from said groove 106. A plurality of suitable friction, leaf springs 108 having short inturned fingers on their lower ends, similar to the fingers 105 of the spring arms, for engaging in the groove 106, also fit in longitudinal slots 107' in staggered relation circumferentially to the spring arms. The upper ends of the leaf springs 108 and the spring arms 101 also fit in longitudinal slots 109 and 109' on the upper end of said cage 102 in similar staggered relation circumferentially to the lower end of said cage. It is pointed out that these leaf springs, together with said cage 102, form the usual friction cage used on practically all hook wall packers.

Figure 9:
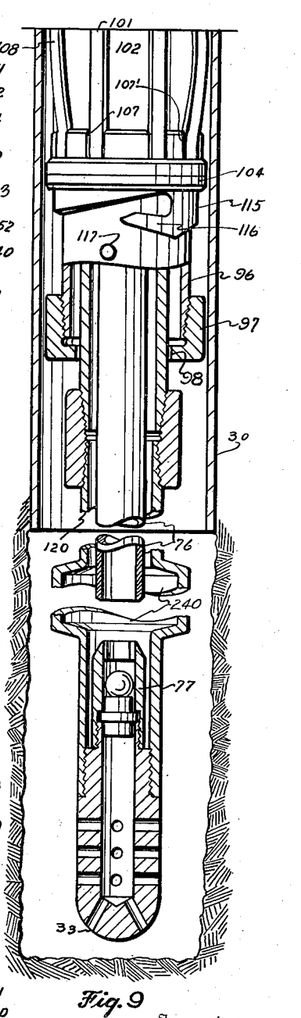
Figure 9 is a continuation of Figure 8, showing the lower portion of said means.

While the drawings show four spring arms and four leaf springs as being used, it is possible to use any number desired. Attention is called to the fact that in case it becomes necessary to replace said leaf springs, or said spring arms; the retaining collar 104 is unscrewed from the threaded section 103, until the inturned fingers on the lower end of said springs and said arms may be removed from said groove 106. The new arms, or springs may be inserted and said collar 104 screwed back in place upon the section 103, as shown in Figures 5 and 9. It will be seen that this collar snugly engages over the lower ends of said springs and arms for locking the same in said slots 107 and 109 and to the cage 102. Should it become necessary to replace any or all of said slips, the upper end of each spring arm is pulled outwardly, which lifts the stud pin 201 on the upper end of said arm out of said socket 200 in the lower end of said slip, freeing said slip. The old slip is replaced with a new one and then the upper end of said arm is released. Thus, it is possible to readily replace or repair this portion of the packer.

The lower end of said cage is provided with a depending, annular skirt 115, in which is formed a bayonet slot 116. The lower edge of said skirt is so inclined that a stud or dowel pin 117 on the mandrel 96 will at all times upon the rotation of said cage or mandrel be led into the bayonet slot to lock or hold said cage. This slot and stud will hold said cage in its lowermost position and prevent said slips 100 riding upon the guide surface 99 of the collar 97 and gripping the casing 30. Whenever the pin 117 is disengaged from said slot 116, the frictional engagement of said leaf springs 108 with the wall of said well casing will momentarily hold said cage 102, so that said packer will drop therethrough. The slips, of course, will be held stationary with said cage and the guide surface 99 of said collar 87 will drop down into said slips and force the same outwardly, whereby said slips will grip said casing and prevent further downward movement of said packer and tubing 31.

The upper end of the collar 93 is reduced to form an external, annular recess 110 which is threaded to receive a short, narrow band or collar 111 to which a packing member 112 is attached by a number of rivets 113, or other suitable means. The packing member is in the form of a cylindrical sleeve or collar which snugly engages the mandrel 89 and is preferably made of "Neoprene" reinforced with canvas, but may be of rubber, rubber compound, or any other material suitable for the purpose.

In order to expand the packing collar into sealing position, said slips 100 have to be set so as to grip said casing and arrest the downward travel of said packer, whereby the inclined surface 114 on the lower end of the sleeve 87 will drop down between said packing collar 112 and mandrel 89, which will compress and expand said collar into contact with the inner wall of the well casing, gripping the same and forming a fluid and pressure tight seal at this point. The packing collar being of a suitable rubber compound reinforced with canvas or a similar material, will not be loosened on account of jarring or bouncing caused by the pumping or reciprocation of any elements within the well. Also, said collar will absorb the vibration of the tubing and prevent the same from unduly stirring up the formation sand and causing unnecessary wear or cutting action by the flow of sand with the well fluid, or completely clogging the tubing.

Figure 8:
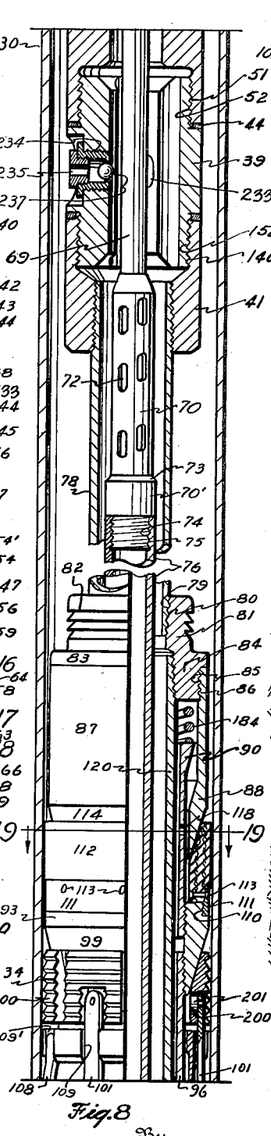
Figure 8 is a continuation of Figure 7, showing the middle portion of said means.
Figure 11:
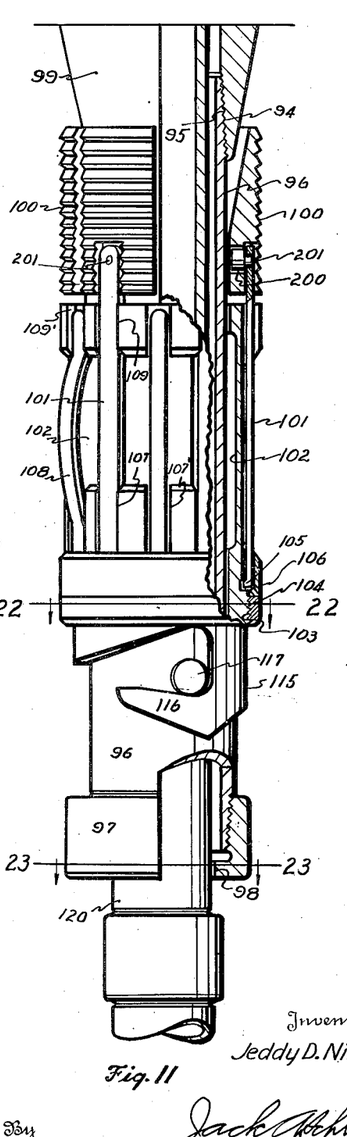
Figure 11 is a continuation of Figure 10, showing the lower portion of the packer.
Figure 12:
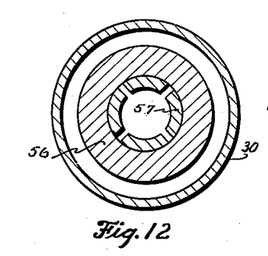
Figure 12 is a horizontal, cross-sectional view taken on the line 12—12 of Figure 2.
Figure 13:
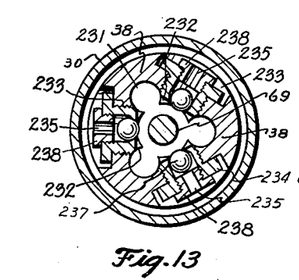
Figure 13 is a similar view taken on the line 13—13 of Figure 4.
Figure 14:
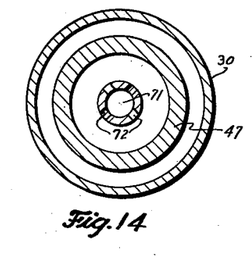
Figure 14 is a horizontal, cross-sectional view taken on the line 14—14 of Figure 4.
Figure 15:
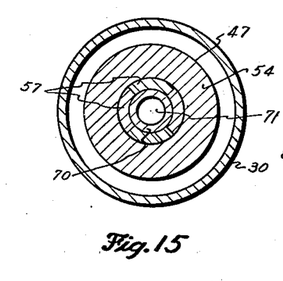
Figure 15 is a similar view taken on the line 15—15 of Figure 4.
Figure 16:
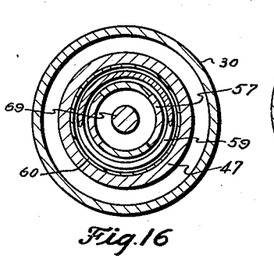
Figure 16 is a horizontal, cross-sectional view taken on the line 16—16 of Figure 7.
Figure 17:
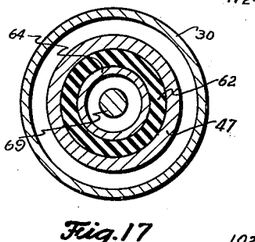
Figure 17 is a similar view taken on the line 17—17 of Figure 7.
Figure 18:
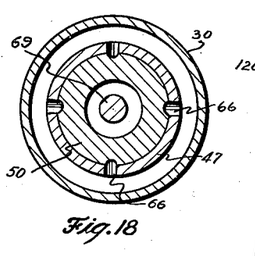
Figure 18 is a horizontal, cross-sectional view taken on the line 18—18 of Figure 7.
Figure 19:
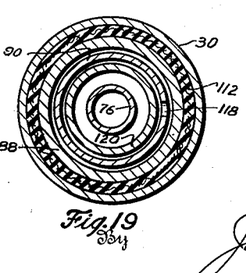
Figure 19 is a similar view taken on the line 19—19 of Figure 8.
Figure 20:
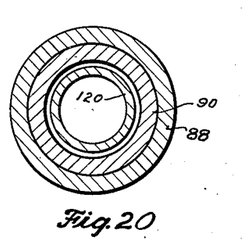
Figure 20 is a horizontal, cross-sectional view taken on the line 20—20 of Figure 10.
Figure 21:
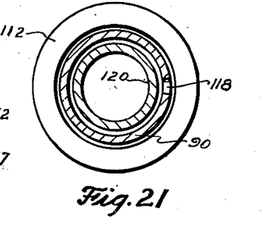
Figure 21 is a similar view taken on the line 21—21 of Figure 10.
Figure 22:
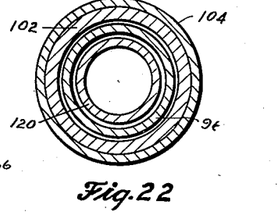
Figure 22 is a horizontal, cross-sectional view taken on the line 22—22 of Figure 11.
Figure 23:
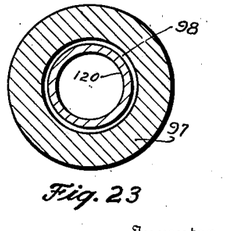
Figure 23 is a similar view taken on the line 23—23 of Figure 11.
Figure 24:
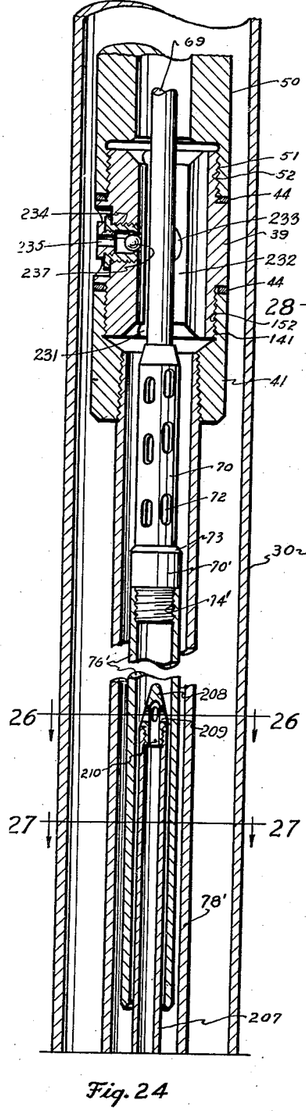
Figure 24 is a vertical, longitudinal sectional view of a modified form of the invention.
Figure 25:
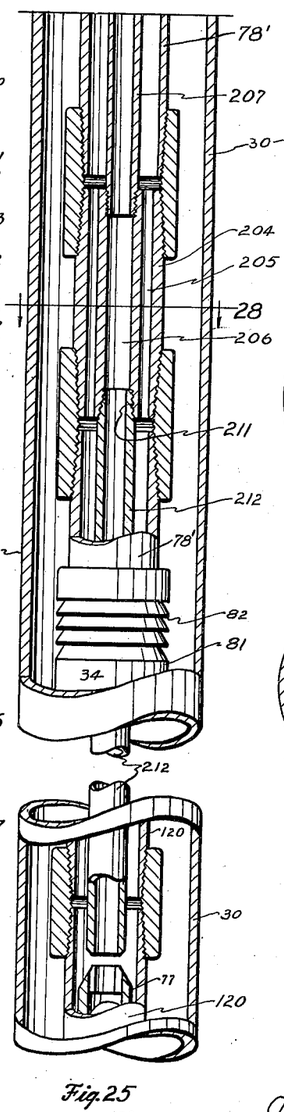
Figure 25 is a continuation of Figure 24, showing the lower part of the modification.
Figure 26:
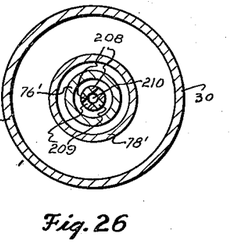
Figure 26 is a horizontal, cross-sectional view taken on the line 26—26 of Figure 25.
Figure 27:
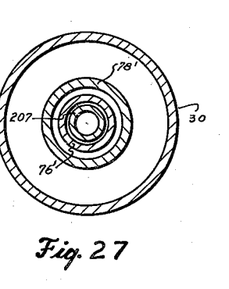
Figure 27 is a similar view taken on the line 27—27 of Figure 24.
Figure 28:
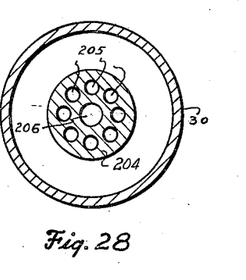
Figure 28 is a horizontal, cross-sectional view taken on the line 28—28 of Figure 24.

If the slips have accidentally set at a point in the well where it is not intended or desired to set the packer, which is a frequent occurrence in running this type of a packer, the tubing is lifted and rotated to the left or in a counterclockwise direction (Figure 11), so as to engage the pin 117 in the slot 116. As soon as said pin has engaged in said slot (Figure 11), said tubing and packer are again lowered until the point in said casing is reached where it is desired to set said packer. It is pointed out that regardless of the number of times which said packer accidentally sets, the construction of said packing collar and said packer prevents any serious damage being done to said packing collar. When the packer has been lowered to the point at which it is desired to set said packer, said tubing is rotated to the right or in a clockwise direction (Figure 11), releasing said pin 117 from said slot 116. The lowering of said tubing is then continued while the frictional engagement of the leaf springs 108 with the inner wall of said casing 30 will hold said slips 100 stationary, so as to grip said casing as shown in Figures 5 and 8, and permit said sleeve 87 to drop. The inclined surface 114 on the lower end of said sleeve 87 drops between said packing collar 112 and said mandrel 89 to compress and expand said collar 112. The packer is now set and the parts now are in the position, as illustrated in Figures 5 and 8. It will be seen that the annular space inside of said well casing and outside of said tubing is closed or sealed off, so that a pressure fluid reservoir is formed in the annular space above said packer.

Figure 10:
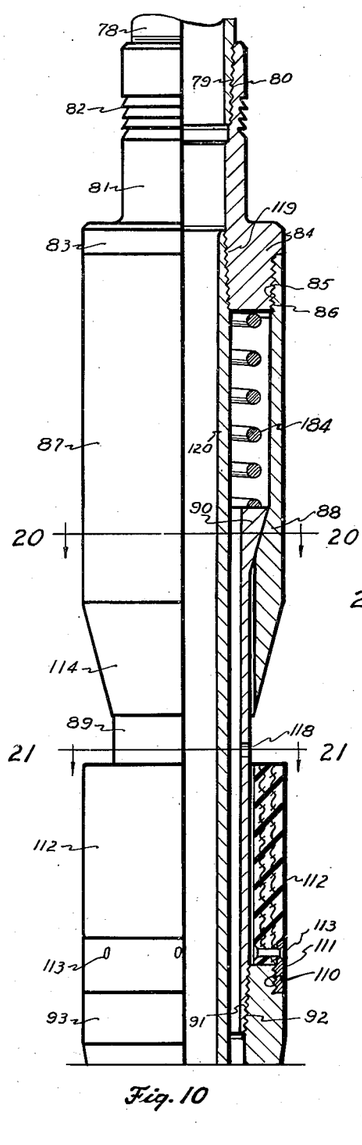
Figure 10 is a view, partly in section and partly in elevation, showing the upper portion of a packer that may be used with the invention.

In Figures 3, 5, 8 and 10, a tubing drain or fluid by-pass opening 118 is provided in the mandrel 89 above the upper edge of said packing collar 112, and it will be noticed in Figures 3 and 10, that this fluid by-pass is open to drain the annular space above said packer and to permit said packer to be lowered more readily in the well fluid, when said sleeve 87 is in its uppermost position. It is pointed out that a coil spring 184 is positioned within said sleeve 87 between the lower edge of the depending pin 84 and the upper edge of said tapered head 90. This spring is under tension so as to prevent said sleeve from falling and covering said by-pass opening 118 when said packer is being lowered in said well, whereby the function of said opening is not interfered with, as well as to hold said mandrel 89 and said cap 81 apart.

The depending pin 84 of said cap 81 is provided with internal screw-threaded socket 119 for receiving the upper end of an auxiliary string of tubing 120. This string depends from said threaded socket 119 through and below said packer to whatever distance it is desired. The lower end of said tubing string 120 is connected to the upper end of the perforated bull plug 33 and telescopes over the usual standing valve 77 mounted on the upper end of said plug. Whenever said packer is being lowered into a well, said well fluid will flow up around the tubing 120, through the opening 98, inside of and through the mandrel 96 and 89 and out of the by-pass opening 118. As will be seen in Figures 5 and 8, this opening will be closed and sealed off whenever the inclined surface 114 engages said packing collar 112.

When it is desired to unset or remove the packer from the well, said tubing is lifted and the inclined socket 88 engages the tapered head 90, lifting the mandrel 89 and opening the by-pass opening 118, so that any fluid within the casing above the packer will bleed therethrough and into the casing therebelow, whereby a dry string of casing will be had and the lifting of the additional load of fluid above said packer will not be added to said tubing string. The continued lifting of said tubing will disengage said slips 100 from said casing wall and said packer may now be pulled from the well in this condition, or said tubing may again be rotated to the left or in a counter-clockwise direction to engage the pin 117 in the slot 116, if desired.

In operation, the fluid level of the well is ascertained and the flow valves 35, flow control device 50', packer or seal-off device 34, bull plug 33, standing valve 77 and any other equipment to be installed are made up in the tubing string 31, as said tubing is lowered into said well casing 30, all in accordance with the conditions found present. It is pointed out that the invention is very flexible and can be adjusted to suit any well condition encountered. The various elements or conditions taken into consideration include, the size of tubing being used; the size of casing in the well; the liquid level in the well, that is, the level at which the well liquid normally stands in the casing; the bottom hole pressure, that is, the pressure of the gas in the oil sand at the bottom of the well; the supply and pressure of the pressure fluid; the point from which it is desired to lift the well fluid, that is, operate the well; and the amount of well fluid that is desired to be removed from the well each day, or at each operation.

The bull plug 33 or a screen (not shown) of the desired length is screwed onto the lower end of said tubing string and the usual standing valve 77 is preferably connected onto the upper end of said bull plug. The entire assembly is lowered into said well casing 30, until said bull plug or screen reaches the level or depth at which it is desired or deemed best to operate or produce from, usually near the bottom of the well and below the lower end of said well casing. The desired or necessary number of flow valves 35 are inserted in said tubing string, in accordance with the above-mentioned conditions of said well.

After said tubing string 31 is made up and the packer or seal-off 34 set, said tubing is suspended within said casing from the casing head 32 and said hollow bar or rod 76 is made up and inserted into the upper end of said tubing string. The perforated tubular sleeve 70 and said reduced portion 69 of said weight bar 68 are threaded onto the upper end of said hollow bar 76. The weight bar is made up and connected onto the upper end of said reduced portion and onto the lower end of said wire line 36, and then the whole assembly is lowered into the well tubing, but not down to the fluid flow control means 50'. The weight bar 68 serves two purposes in that it provides the required weight necessary for the successful operation of the hollow bar 76 and as an actuating member for the flow valves 35 and the dogs 57. A suitable stuffing box (not shown) is mounted on the upper end of said tubing, so as to close the upper end of said tubing and to seal around said wire line. The parts will be in the position shown in Figures 2 and 3, because the pressure fluid has not been admitted into said well casing.

Figure 6:
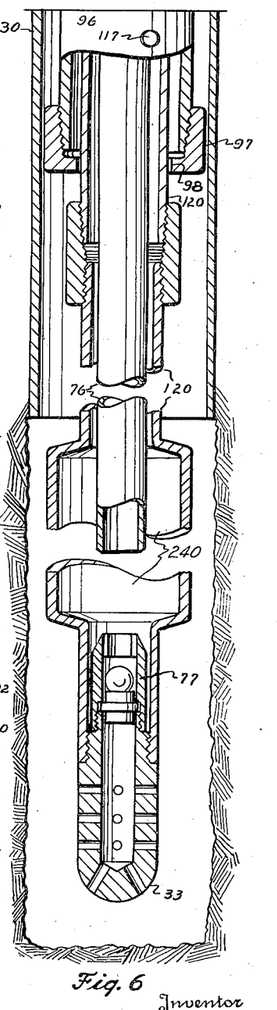
Figure 6 is a continuation of Figure 5 showing the lower portion of said means.

As soon as pressure fluid is admitted to said casing and the pressure builds up, this hollow bar assembly is then lowered into the uppermost flow valve 35 which is kicked off; that is, the well fluid in said casing has been produced down to this point by the pressure fluid introduced into the upper end of said casing forcing said well fluid through said open flow valve. Of course said pressure fluid enters said opened flow valve and lifts said well fluid up and out of said tubing. The flow valve 35 may be opened by said hollow bar 76 or said weight bar 68. The assembly is then lowered to the next flow valve, if more than one flow valve is used, where the same action is repeated as taught in my above-mentioned patents. This is kept up until all of the well fluid above said flow control device 50' is lifted or produced down to the last flow or kick-off valve above said device. If only one flow valve 35 is used, then the flow control device 50' is ready for actuation or if no flow valve is used, then said flow control device is the first valve to be actuated. When the level of said well fluid has been lowered to this valve, the hollow bar 76 is lowered into the upper part of said device to hold the balls 237 of the inserts 234 of the valve bodies 38 and 39 off their seats. While in this position, the pressure fluid in said casing above the well fluid forces said well fluid through the passageways 235 around said balls 237 into said valve bodies 38 and 39 and up said tubing out of the well. When substantially all of said well fluid has reached the surface, the regular flow line valve (not shown) on the surface is closed, so that the pressure in said well tubing and in said casing will become equalized. Of course, the level of said well fluid at this time will be approximately on a line with said passageways 235 of said valve body 39. After the pressure in said tubing and casing has been equalized, the spring 59 will force the piston 60, the dogs 57 and the sealing ring 62 to their lower position, whereby said dogs are retracted and said hollow bar 76 may be dropped through said valve body 38, said restricted passage 54, said dogs 57 and said valve body 39 to a position as shown in Figures 7, 8 and 9. Although, said hollow bar 76, said weight bar 68 and said reduced portion 69 may be stopped approximately in the position shown in Figures 4, 5 and 6. After said hollow bar 76 has passed through said dogs 57, the usual flow line valve (not shown) is opened so that there will be a greater pressure in said casing 30 than within said tubing 31, whereby said dogs will again be elevated to their sealing or locking position (Figure 4) and lock said hollow bar 76 in said flow control device 50'.

The hollow bar 76 may be dropped down through said dogs 57 without equalizing the pressure within said casing and said tubing in order that said dogs may be in their lowermost or open position. However, to drop said hollow bar therethrough without releasing said dogs would scratch and score the outer surface of said hollow bar, as well as the possibility of damaging said dogs. As will be seen in Figures 4, 5 and 6, said hollow bar is in its upper or operating position in said fluid flow control device 50'. In this position, the ball valves 237 of valve body 239 are held open and the dogs 57 seal around said hollow bar so that the flow of pressure fluid entering through the port 235 has to flow down around said hollow bar. In Figures 7, 8 and 9, the lower or inoperative position of said weight bar 68 and said hollow bar 76 are shown and said hollow bar may be moved from its upper position in Figures 4 and 5 to its lower position, as shown in Figures 7 and 8, without moving or disturbing said dogs 57.

When the well fluid level does reach said flow device 50', the pressure fluid enters or exerts a pressure through the radial ports 66 underneath the sealing ring 62 which lifts said ring, said piston 60 and said dogs 57 to the position shown in Figures 4 and 7, which is the engaging and sealing position. The fluid flow control device is now ready for actuation. The wire line 36 is operated from the surface by any suitable means (not shown) and the actuation of said hollow bar 76 is controlled by the operation of said wire line. It is preferred to operate said wire line at pre-determined intervals so as to give an intermittent actuation to said hollow bar, although the invention is not to be so limited as said bar may be held in its inoperative position (Figures 7, 8 and 9) or its operative position (Figures 4, 5 and 6), or said bar may be actuated as desired.

Whenever the wire line is lifted to actuate the well fluid flow control device 50' (Figure 1), the perforated sleeve 70 passes through the valve body 39 and the inclined shoulder or seat 73 of the upset portion 70' engages said balls 237 of said valve body 39, pushing said balls off their seats in said passageways 235 of said inserts 234. The hollow bar 76 abutting said upset portion will pick up and hold said balls in an open position, as the lifting of said wire line 36, weight bar 68 and attached structure is continued. As soon as said balls are opened, pressure fluid from said casing flows through said passageways into said valve body 39 and up around said hollow bar and sleeve 70 and into said tubing 31. However, when the shoulder 73 engages the under surface of the dogs 57 (Figure 4), a fluid tight seal is formed and upward passage of fluid at this point is prevented and said hollow bar has reached its operative position. The pressure fluid is now trapped so that it has to flow down around said hollow bar, pushing the well fluid before it, to the lower end of said hollow bar.

While the bore of the sub 50, the valve body 39, the nipple 78 and the auxiliary string of tubing 120 contain well fluid, the pressure fluid will force all of the well fluid therein, above the lower end of said hollow bar, into and up through said bar and out of the perforations 72 of the sleeve 70, into the bore 53 of the sleeve 47, through the bore of the valve body 38 into the tubing 31 and out of said well. It is preferred to lower said hollow bar and weight bar 68 to their inoperative position (Figures 7, 8 and 9), as soon as the well fluid reaches the surface or until sufficient pressure fluid has been admitted through said passageways 235 to expel all of said well fluid. However, said hollow bar may be operated as desired. When said hollow bar has been returned to its inoperative position (Figures 7, 8 and 9), it remains there until the next period of actuation.

When it is decided to pull the tubing or remove said flow device from the well, said hollow bar 76 is lifted to its operative position (Figures 4, 5 and 6) which holds the balls 237 of the valve body 39 open. If desired, the flow line valve (not shown) on the surface may be closed after all of the well fluid has reached the surface, or it may be closed immediately. When the pressure in said well tubing and said well casing has become equalized, said hollow bar is lowered so as to permit the spring 59 to lower said dogs 57, piston 60 and sealing ring 62, whereby said hollow bar is now free to be lifted up and out of said tubing. However, if said spring is not strong enough to unstick and return said dogs, said piston and sealing ring to their original or inoperative position, the lower end of said weight bar 68 is so shaped as to be lowered onto and engage the upped ends of said dogs to bump or loosen the same, whereby said spring will then force them to their lower position. The weight bar and said hollow bar are now free to be withdrawn from said well. After said wire line and bar 76 have been removed, the tubing may then be pulled, if desired. It is pointed out that as soon as the dogs release and return to their inoperative position, any formation gas will be released from said chamber and permitted to rise in said tubing. Also, whenever said hollow bar 76 is in its inoperative position, any formation gas will be released from said chamber.

In Figures 24 to 28 inclusive, I have shown a modified form of the invention which is particularly used where the point of production, or the lower end of the hollow bar extends too far below the packer and the flow control device 50' and places too great a weight on the wire line and the actuating mechanism (not shown) therefor. The principle of construction and operation is the same, but the invention has been designed to suspend the major portion of the hollow bar by connecting the same to the tubing.

The pin 74' of said tubular sleeve 70 is threaded into the upper end of a relatively short, hollow bar member 76' (Figure 24), which has its lower end beveled outwardly the same as the hollow bar 76 and for the same reasons. However, the lower end is also beveled inwardly. The nipple 78' connecting the collar 41 of said flow device 50' to said packer 34 is usually longer than the nipple 78, because a short flow nipple or coupling 204 has to be mounted therein. This coupling has a plurality of longitudinal passageways 205 as well as an axial bore 206. The upper end of said bore is threaded to receive a relatively short, upstanding tubular guide or pin 207 which has threaded onto its upper end an elongate, pointed cap 208. This cap is externally tapered so as to co-act with the inward bevel of said hollow bar member 76' which may readily telescope over said upstanding pin 207. The lower portion of said cap is provided with an axial bore 210, the upper end of which is connected to a plurality of perforations 209; so that fluid may flow up the axial bore 206 of said coupling 204, through the pin 207, the bore 210 of said cap 208, out of said perforations 209 and into and up the bore of said hollow bar member 76'.

The lower end of said bore 206 of said coupling 204 also is threaded for receiving the pin 211 on the upper end of the small string of tubing 212 forming the continuation of said hollow bar 76'. It is pointed out that this tubing section 212 may be as long as necessary or as is desired.

When the hollow bar 76' is pulled up into its operating position, the same as the bar 76, the pressure fluid flows past the balls 237 down around the bar 76' and the pin 207, through the passageways 205 of the coupling 204, down around the hollow bar 212, into the lower end ad up the bore of said bar 212, through the bore 206 of said coupling 204, through the pin 207, the bore 210 of said cap 208, out of the perforations 209, up the bore of the bar 76', the bore 71 of the sleeve 70 and out the perforations 72 of said sleeve the same as in the other form.

What I claim and desire to secure by Letters Patent is:

1. A system of flowing well fluid in a well which consists in, a well tubing for providing a column of well fluid, a source of pressure fluid extraneous to the well tubing, means connected to said well tubing for introducing pressure fluid from said source onto the upper surface of said column of well fluid for forcing said column downwardly, and means in said tubing controlled from the well surface for actuating said introducing means and for receiving and conducting the flowing column of well fluid upward into said tubing beyond said introduction means, whereby said well fluid may be lifted by the pressure fluid from a point in said tubing below said pressure fluid introduction means.

2. A system of flowing well fluid in a well which consists in, a well tubing for providing a column of well fluid, a source of pressure fluid extraneous to the well tubing, means connected to said well tubing for introducing pressure fluid from said source onto the upper surface of said column of well fluid for forcing said column downwardly, means in said tubing controlled from the well surface for actuating said introducing means and for receiving and conducting the flowing column of well fluid upward into said tubing beyond said introduction means, whereby said well fluid may be lifted by the pressure fluid from a point in said tubing below said pressure fluid introduction means, and sealing means in said tubing above said introduction means for forming a seal around said actuating means and preventing the upward flow of pressure fluid from said introduction means.

3. A system of controlling the flow of well fluid in a well which consists in, a well tubing for providing a column of well fluid, a source of pressure fluid extraneous to the well tubing, means connected to said well tubing for introducing pressure fluid from said source onto the upper surface of said column of well fluid for forcing said column downwardly, means in said tubing and controlled from the surface for actuating said introduction means, and conducting means extending into said column and connected to and co-acting with said actuating means for receiving and conducting the flowing column of well fluid up beyond said introduction means for elevating and delivering said well fluid to said actuating means which in turn exhausts said well fluid into said tubing, whereby said well fluid may be lifted by the pressure fluid from a point in said tubing below said pressure fluid introduction means.

4. In a well fluid flow control device connected in a well tubing including, an elongate body having an axial bore therethrough, a radial port extending from the bore, a valve for said port adapted to be operated from said bore, tubular actuating means depending in the well tubing and in said body for actuating said valve and having a well fluid passage connecting with the tubing, whereby the well fluid flows through said tubular actuating means into said well tubing, and packing means connected in said tubing below said body for closing the space between said tubing and the wall of said well.

5. In a well flowing device connected in a well tubing including, an elongate body having an axial bore therethrough, a radial port extending from the bore, a valve for said port adapted to be operated from said bore, tubular actuating means depending in said well tubing and in said body for actuating said valve and having a well fluid passage connecting with the tubing, whereby the well fluid flows through said tubular actuating means into said well tubing, sealing means for forming a seal in said bore around said actuating means for causing well fluid to flow through the passage thereof, and packing means connected in said tubing below said body for closing the space between the well tubing and the wall of the well.

6. In a well fluid control device connected in a well tubing including, an elongate body having an axial bore therethrough, a radial port extending from said bore, a valve for said port adapted to be operated from said bore, tubular actuating means having a well fluid passage connecting with the tubing and depending in the well tubing and in said body for actuating said valve, whereby the well fluid flows through said tubular actuating means into said tubing, pressure actuated sealing means for forming a seal in said bore around said actuating means for causing well fluid to flow through the passage thereof, and packing means connected in said tubing below said body for closing the space between said well tubing and the wall of the well.

7. In a well fluid flowing device connected in a well tubing including, an elongate body having an axial bore therethrough, a radial port extending from the bore, a valve for said port adapted to be operated from said bore, tubular actuating means connecting with said tubing and depending in said body for actuating said valve, whereby the well fluid flows through said tubular actuating means into said well tubing, operating means depending in said well tubing for operating said actuating means, and packing means connected in said well tubing below said body for closing the space between said tubing and the wall of the well to shut off the well therebelow, said tubular actuating means depending through and below said packing means to conduct well fluid from the well below said packing means.

8. In a well fluid flowing device connected in a well tubing including, an elongate body having an axial bore therethrough, a radial port extending from the bore, a valve for said port adapted to be operated from said bore, tubular actuating means having a well fluid passage connecting with said tubing and depending in said body for actuating said valve, whereby the well fluid flows through said tubular actuating means into said well tubing, operating means depending in said well tubing for operating said actuating means, sealing means for forming a seal in said bore around said actuating means for causing well fluid to flow through the passage thereof, and packing means connected in said well tubing below said body for closing the space between said tubing and the wall of the well, said tubular actuating means depending through and below said packing means to conduct well fluid from the well below said packing means.

9. In a well fluid flowing device connected in a well tubing including, an elongate body having an axial bore therethrough, a radial port extending from the bore, a valve for said port adapted to be operated from said bore, tubular actuating means having a well fluid passage connecting with said tubing and depending in said body for actuating said valve, whereby the well fluid flows through said tubular actuating means into said well tubing, operating means depending in said well tubing for operating said actuating means, pressure actuated sealing means for forming a seal in said bore around said actuating means for causing well fluid to flow through the passage thereof, and packing means connected in said well tubing below said body for closing the space between said tubing and the wall of the well, said tubular actuating means depending through and below said packing means to conduct well fluid from the well below said packing means.

10. In a well fluid flowing device for connecting in a well tubing string including, an elongate body having an axial bore, a radial port extending from the bore, a valve for said port adapted to be operated from said bore, actuating means movable axially in said body for operating said valve and having a flow passage for conducting well fluid, a conductor carried by the actuating means in communication with the passage thereof and extending below said valve for delivering fluid from said conductor into the flow passage, and sealing means above the valve through which the actuating means is movable, whereby fluids are caused to flow through said conductor and actuating means.

11. A well flowing apparatus of the type wherein lifting fluid is stored in the casing in such volume and under such pressure as to elevate and discharge a column of well fluid from the usual single string of tubing at each operation, an operating member suspended in the tubing by a line connection extending from the surface down into the tubing, and also wherein a lifting fluid inlet valve has an actuating element exposed in the tubing and disposed to be actuated by the operating member, in combination with a well fluid accumulating chamber located at the lower portion of the tubing and having a well fluid inlet, the lifting fluid inlet valve being located and connected to deliver lifting fluid to the upper portion of the accumulating chamber, said operating member extending through said valve, and a conductor below the valve and having connection with said operating member for conveying accumulated well fluid from the lower portion of the accumulating chamber into said operating member from which it is delivered into said tubing so that such accumulation may be displaced by the lifting fluid delivered in the upper portion of said chamber.

12. A well flowing apparatus of the type wherein lifting fluid is stored in the well casing in such volume and under such pressure as to elevate and discharge a column of well fluid from the usual single string of tubing at each operation, a well fluid accumulating chamber having a well fluid inlet, a conductor for delivering lifting fluid to the upper portion of the accumulating chamber, a lifting fluid inlet valve connected with the conductor, and a tubular conductor vertically movable into said chamber for conveying well fluid therefrom to said tubing, said tubular conductor having means for actuating the inlet valve.

13. A well flowing apparatus of the type wherein lifting fluid is stored in the well casing in such volume and under such pressure as to elevate and discharge a column of well fluid from the usual single string of tubing at each operation, a well fluid accumulating chamber having a well fluid inlet, a conductor for delivering lifting fluid to the upper portion of the accumulating chamber, a lifting fluid inlet valve connected with the conductor, a tubular conductor vertically movable into said chamber for conveying well fluid therefrom to said tubing, said tubular conductor having means for actuating the inlet valve, and sealing means in the lifting fluid conductor above the inlet valve disposed to seal around said tubular conductor when the latter is moved to actuate said inlet valve.

14. In a well fluid flow control device adapted to be mounted in a well having the usual well casing and well tubing suspended in said casing including, a flow valve disposed in said casing and connected to said tubing, packing means connected in said well tubing below said valve for packing off the space between said well tubing and said well casing to shut off the well therebelow, a well fluid collecting chamber in said casing below said packer and connected to said tubing and said flow valve, a standing valve mounted in the lower end of said chamber to provide a well fluid inlet of said chamber, a pressure fluid passageway extending from said well casing through said flow valve to the upper end of said chamber, a fluid flow conduit extending from the lower portion of said chamber through the valve and delivering said fluid to said tubing, said flow valve having an actuating portion exposed in the well tubing bore, and valve operating means movable in said tubing for engaging and operating said valve portion.

15. In a well flowing apparatus, the combination of, an elongate structure having a passage therethrough for connecting at its upper end with the usual well tubing, a well fluid accumulating chamber connected with the lower end of said passage, a pressure fluid inlet valve opening to said passage and having an actuating element exposed in said passage, a seal in the passage and located above said valve, and an elongate operating member engaging the valve actuating element movable in the passage of said structure and having means for engaging the seal to shut off the passage for preventing the upward flow of fluid around the operating member, the operating member having a conduit extending from the accumulating chamber and discharging into the passage above the seal when the member is engaged with the latter.

16. In a well fluid flowing device including a string of well tubing suspended in a well, an elongate body having connecting collars on each end thereof for connecting said body in the well tubing string, an axial bore extending through said body so as to form a continuous passageway with said well tubing, a radial port in the upper portion of said body, a valve for said port adapted to be operated from the bore of said body, a second port in the lower portion of said body, a valve for said second port adapted to be operated from the bore of said body, an elongated actuating member depending in said body and in said well tubing therebelow for operating said valves in said ports, said actuating member having an opening in its lower end for receiving and conveying fluid therethrough into said tubing, a wire line depending in said well tubing for suspending said actuating member and rapidly operating the same, pressure actuated sealing means in said bore of said body for forming a fluid-tight seal in said bore around said actuating member for preventing the upward flow of fluid around said member, packing means connected in said well tubing below said elongate body for closing off the space between said well tubing and the wall of said well, and a weight bar connected to the lower end of said wire line for suspending said actuating member.

17. In a well fluid flowing device including a string of well tubing suspended in a well, an elongate body having connecting collars on each end thereof for connecting said body in the well tubing string, an axial bore extending through said body so as to form a continuous passageway with said well tubing, a radial port in the upper portion of said body, a valve for said port adapted to be operated from the bore of said body, a second port in the lower portion of said body, a valve for said second port adapted to be operated from the bore of said body, an elongated actuating member depending in said body and in said well tubing therebelow for operating said valves in said ports, said actuating member having an opening in its lower end for receiving and conveying fluid therethrough into said tubing, a wire line depending in said well tubing for suspending said actuating member and rapidly operating the same, pressure actuated sealing means in said bore of said body for forming a fluid-tight seal in said bore around said actuating member for preventing the upward flow of fluid around said member, packing means connected in said well tubing below said elongate body for closing off the space between said well tubing and the wall of said well, and a weight bar connected to the lower end of said wire line for suspending said actuating member, said weight bar and actuating member being connected together by a reduced portion, the lower end of said weight bar being shaped so as to assist in the release of said sealing means.

18. In a well fluid flowing device including a well tubing, an elongate body having an axial bore therethrough, a radial port extending from the bore, a valve for said port adapted to be operated from said bore, tubular actuating means depending in said well tubing and in said body for actuating said valve, said actuating means receiving fluid at its lower end, whereby the fluid flows through said tubular actuating means into said tubing, a plurality of dogs surrounding said actuating means, and means co-acting with said dogs for forming a fluid-tight seal in said bore of said body around said actuating means and preventing the upward flow of fluid around said member.

19. In a well fluid flow control device including, a string of well tubing suspended in a well, an elongate body having collars on each end for connecting said body into said well tubing string, an axial bore extending through said body so as to form a continuous passageway with said well tubing, a radial port in the upper portion of said body, a valve for said port adapted to be operated from the bore of said body, a second port in the lower portion of said body, a valve for said second port adapted to be operated from the bore of said body, an elongated actuating member suspended in said well tubing and said body for operating said valves in said ports, said actuating member having an opening in its lower end for receiving and conveying fluid therethrough into said tubing, a plurality of dogs surrounding said actuating means, and means co-acting with said dogs for forming a fluid-tight seal in said bore of said body around said actuating means and preventing the upward flow of fluid around said member.

20. In a well fluid flow device including, a well tubing, an elongate body having an axial bore therethrough, an inlet port in said body providing communication between the outside and the bore of said body for admitting fluid into said body, a valve cage mounted in said port and having a passageway extending therethrough, an external flange on one end of said cage, a seat at one end of said passageway in said cage, a ball valve in said passageway for co-acting with said seat to open and close said passageway, said ball valve normally being in an open position and being arranged to be closed by the passage of fluid through said passageway and to be opened from the surface of the well, surface controlled tubular actuating means depending in said well tubing and movable into said body for opening said ball valve to permit the passage of fluid through said passageway of said cage, said actuating means receiving fluid at its lower end, whereby the fluid flows through said tubular actuating means into said tubing, and a guide within the bore of said body for guiding said means into said body.

21. A system of flowing well fluid in a well having a well casing provided with a supply of lifting fluid and the usual tubing therein including, a packer carried by the tubing for sealing off the space between the casing and the tubing, an accumulating chamber below the packer, means for conducting accumulated well fluids from the chamber to the tubing, means for conducting lifting fluid from the casing to the chamber, an inlet valve connected with the lifting fluid conducting means, a surface operated device for actuating said inlet valve to control the duration of admission of lifting fluid and the quantity admitted, and an unloading valve in the tubing above said inlet valve for admitting lifting fluid from the casing, said unloading valve being actuated by the same means as the inlet valve.

22. A well flowing apparatus for a well having a low fluid producing level wherein a string of tubing is disposed in the well casing, a packer mounted in the well casing adjacent the producing level, a pressure fluid inlet valve mounted to admit pressure fluid from above the packer into said tubing, an unloading valve connected to said tubing for admitting fluid from said casing into said tubing to increase the pressure fluid reservoir by removing fluid from said casing, a surface controlled and operated member movable vertically in said tubing to actuate said inlet valve and said unloading valve, a well fluid accumulating chamber below the packer connected with the tubing and provided with a foot valve, in combination with means for conducting the admitted pressure fluid from the inlet valve and discharging it into the upper portion of the accumulating chamber to displace the well fluid therein downwardly, and a flow conduit extending from the lower portion of the chamber and connected with the tubing for receiving fluid from said chamber and delivering the fluid to said tubing.

23. In a well fluid flow control device adapted to be connected in the string of well tubing suspended in a well including, an elongate body having collars on each end for connecting said body into said well tubing string, said body having an axial bore extending therethrough so as to form a continuous passageway with said well tubing, a radial port in the upper portion of said body, a valve for said port adapted to be operated from the bore of said body, a second port in the lower portion of said body, a valve for said second port adapted to be operated from the bore of said body, an elongated actuating member suspended in said well tubing and said body for operating said valves in said ports, and sealing means within the bore of said body between said ports for forming a fluid-tight seal between said actuating member and the wall of said bore of said body to shut off one port from the other, said actuating member having a fluid passageway extending partially therethrough to deliver fluid from a point below to a point above said sealing means.

24. In a well fluid flow control device adapted to be connected in the string of well tubing suspended in a well including, an elongate body having collars on each end for connecting said body into said well tubing string, said body having an axial bore extending therethrough so as to form a continuous passageway with said well tubing, a radial port in the upper portion of said body, a valve for said port adapted to be operated from the bore of said body, a second port in the lower portion of said body, a valve for said second port adapted to be operated from the bore of said body, an elongated actuating member suspended in said well tubing and said body for operating said valves in said ports, and pressure actuated sealing means in the bore of said body between said ports for forming a fluid-tight seal in said bore around said actuating member to shut off one port from the other, said actuating member having a fluid passageway extending partially therethrough to deliver fluid from a point below to a point above said sealing means.

25. In a well fluid flow control device adapted to be connected in the string of well tubing suspended in a well including, an elongate body having collars on each end for connecting said body into said well tubing string, said body having an axial bore extending therethrough so as to form a continuous passageway with said well tubing, a radial port in the upper portion of said body, a valve for said port adapted to be operated from the bore of said body, a second port in the lower portion of said body, a valve for said second port adapted to be operated from the bore of said body, an elongated actuating member suspended in said well tubing and said body for operating said valves in said ports, sealing means within the bore of said body between said ports for forming a fluid-tight seal between said actuating member and the wall of said bore of said body to shut off one port from the other, said actuating member having a fluid passageway extending partially therethrough to deliver fluid from a point below to a point above said sealing means, and packing means connected in said well tubing below said elongate body for packing off the space between said well tubing and the wall of said well to shut off the well therebelow.

26. In a well fluid flow control device adapted to be connected in the string of well tubing suspended in a well including, an elongate body having collars on each end for connecting said body into said well tubing string, said body having an axial bore extending therethrough so as to form a continuous passageway with said well tubing, a radial port in the upper portion of said body, a valve for said port adapted to be operated from the bore of said body, a second port in the lower portion of said body, a valve for said second port adapted to be operated from the bore of said body, an elongated actuating member suspended in said well tubing and said body for operating said valves in said ports, pressure actuated sealing means in the bore of said body between said ports for forming a fluid-tight seal in said bore around said actuating member to shut off one port from the other, said actuating member having a fluid passageway extending partially therethrough to deliver fluid from a point below to a point above said sealing means, and packing means connected in said well tubing below said elongate body for packing off the space between said well tubing and the wall of said well to shut off the well therebelow.

27. A system of flowing well fluid in a well having a well casing and a well tubing within said casing including, a well fluid flow conductor in the well connected to said tubing having an inlet for providing a column of well fluid therein and in said tubing, a supply of pressure fluid in said casing above the fluid level therein, an unloading valve connected to said tubing for admitting fluid from said casing into said tubing to increase the pressure fluid reservoir by removing fluid from said casing, means for admitting pressure fluid from said casing into said tubing, means independent of the tubing controlled from the top of the wall for operating said admitting means and said unloading valves, and means for delivering the admitted pressure fluid to said column of well fluid below the point of admission to elevate the same in said conductor.

28. A system of flowing well fluid in a well having a well casing and the usual tubing including, a well fluid flow conductor in the well having an inlet for providing a column of well fluid therein, a supply of pressure fluid maintained in said casing, an unloading valve mounted in said tubing for admitting fluid from said casing into said tubing, whereby the removal of liquid from said casing enlarges the pressure fluid reservoir for a greater quantity of pressure fluid supply, means for admitting pressure fluid from said casing into said tubing, means independent of the tubing controlled from the surface of the well for operating said admitting means and said unloading valves, and means for delivering the admitted pressure fluid on top of said column of well fluid to elevate the same in said conductor.

JEDDY D. NIXON.